US008689294B1

(12) United States Patent (10) Patent No.: US 8,689,294 B1
Thakur et al. (45) Date of Patent: Apr. 1, 2014

(54) SYSTEMS AND METHODS FOR MANAGING OFFLINE AUTHENTICATION

(75) Inventors: Sanjay Thakur, Bangalore Karnataka (IN); Srinath Venkataramani, Bangalore (IN); Prashant Thakre, Chhattisgarh (IN)

(73) Assignee: Symantec Corporation, Mountain View, CA (US)

( * ) Notice: Subject to any disclaimer, the term of this patent is extended or adjusted under 35 U.S.C. 154(b) by 118 days.

(21) Appl. No.: 13/294,932

(22) Filed: Nov. 11, 2011

(51) Int. Cl.
*G06F 21/00* (2013.01)
*G06F 7/04* (2006.01)
*G06F 17/30* (2006.01)
*G06F 15/16* (2006.01)
*G06F 12/00* (2006.01)
*G06F 12/14* (2006.01)

(52) U.S. Cl.
USPC ............ 726/4; 726/2; 726/3; 726/16; 726/17; 726/21; 713/182; 713/183

(58) Field of Classification Search
USPC ...................... 726/1–21, 26–30; 713/182–186
See application file for complete search history.

(56) References Cited

U.S. PATENT DOCUMENTS

| 8,046,587 | B2 * | 10/2011 | Gantman et al. | 713/182 |
|---|---|---|---|---|
| 2007/0234042 | A1 * | 10/2007 | Gantman et al. | 713/156 |
| 2007/0234063 | A1 * | 10/2007 | Ueda et al. | 713/183 |
| 2007/0300077 | A1 * | 12/2007 | Mani et al. | 713/186 |
| 2011/0047606 | A1 * | 2/2011 | Blomquist et al. | 726/7 |
| 2011/0107401 | A1 * | 5/2011 | Bhai et al. | 726/4 |
| 2011/0239306 | A1 * | 9/2011 | Avni et al. | 726/26 |
| 2012/0204245 | A1 * | 8/2012 | Ting et al. | 726/6 |
| 2013/0219180 | A1 * | 8/2013 | Saino et al. | 713/171 |

OTHER PUBLICATIONS

RSA; RSA Authentication Agents for Microsoft Windows; 2011; EMC Corporation.
RSA Security; Ensuring Secure and Simple Authentication of Enterprise Microsoft Windows Users; 2004; RSA Security Inc.
RSA Secured; RSA SecurID Ready Implementation Guide; Sep. 29, 2003; RSA SecurID.

* cited by examiner

*Primary Examiner* — Tae Kim
(74) *Attorney, Agent, or Firm* — ALG Intellectual Property, LLC

(57) ABSTRACT

A method for managing offline authentication. The method may include 1) identifying an attempt, by a user, to access a client device, wherein accessing the client device requires the user to be authenticated, 2) determining whether the client device is offline, 3) in response to determining that the client device is offline, authenticating the user using offline authentication, wherein offline authentication does not require an active network connection with a remote authentication service, 4) upon successful authentication of the user using offline authentication, allowing the user to access the client device, 5) monitoring the network-connection state of the client device, 6) detecting that the client device is online, and then 7) in response to detecting that the client device is online, locking the client device in order to require the user to reauthenticate using online authentication, wherein online authentication requires the active network connection with the remote authentication service.

20 Claims, 7 Drawing Sheets

SYSTEMS AND METHODS FOR MANAGING OFFLINE AUTHENTICATION

BACKGROUND

Enterprises use various methods to control access to corporate systems, information, and network resources. Some common access-control methods use a single sign-on process whereby a user is authenticated once and then given access to various systems, information, and network resources without the user having to be authenticated again. Because of the level of access allowed by single sign-on access-control methods, authentication using only simple passwords may inadequately protect corporate systems, information, and network resources. To enhance security, many enterprises have adopted a form of two-factor authentication that requires a user to provide more than one type of authentication credential. For example, a user may be required to provide a knowledge-based factor (e.g., a password or something else the user knows) and a token-based factor (e.g., a one-time password or something else the user has).

Typical methods of two-factor authentication may use a central authentication-service provider to validate at least one authentication credential. A central authentication-service provider may reside within a corporate network and be accessible to client devices connected to the corporate network or be cloud based and accessible to client devices connected to the Internet. For this reason, a client device that implements a typical method of two-factor authentication may need to be connected to a corporate network or the Internet to properly authenticate a user before the user can log into the client device.

When a client device is offline (e.g., not connected to the corporate network, not connected to the Internet, or unable to connect with the central authentication-service provider), some methods of two-factor authentication may allow a user to log onto the client device using only authentication credentials that do not need to be validated by central authentication-service provider. This method of authentication may allow a user to bypass two-factor authentication by allowing the user to disconnect the client device from the central authentication-service provider and to provide less than all authentication credentials.

Another method of two-factor authentication may not allow a user to log into the client device until a connection with the central authentication-service provider can be established. This method may unnecessarily restrict access to the client device, especially if two-factor authentication was implemented as a way to secure corporate resources not accessible to the user while the client device is offline. Accordingly, the instant disclosure addresses a need for systems and methods that manage offline authentication.

SUMMARY

As will be described in greater detail below, the instant disclosure generally relates to systems and methods for managing offline authentication by using offline authentication methods to authenticate a user that is attempting to access a client device that is offline and by using online authentication methods to reauthenticate the user once the client device is online.

In one example, a computer-implemented method for managing offline authentication may include 1) identifying an attempt, by a user, to access a client device, 2) in response to identifying the attempt to access the client device, determining whether the client device is offline, 3) in response to determining that the client device is offline, authenticating the user using offline authentication that does not require an active network connection with a remote authentication service, 4) upon successful authentication of the user using offline authentication, allowing the user to access the client device, 5) while the user is allowed to access the client device, monitoring a network-connection state of the client device, 6) while monitoring the network-connection state of the client device, detecting that the client device is online, and then 7) in response to detecting that the client device is online, locking the client device in order to require the user to reauthenticate using online authentication that requires the active network connection with the remote authentication service. In this example, the user may be required to be authenticated prior to being allowed to access the client device.

In some embodiments, the method may further include 1) in response to detecting that the client device is online, authenticating the user using online authentication and 2) upon successful authentication of the user using online authentication, unlocking the client device.

In certain embodiments, the step of determining that the client device is offline may include 1) determining that the network-connection state of the client device is inactive and/or 2) determining that the client device is not connected to the remote authentication service, a domain network, a corporate network, and/or the Internet.

In other embodiments, the step of detecting that the client device is online may include 1) determining that the network-connection state of the client device is active and/or 2) determining that the client device is connected to the remote authentication service, a domain network, a corporate network, and/or the Internet.

In some embodiments, the step of monitoring the network-connection state of the client device may include monitoring the network-connection state of the client device for a network-connection event. In these embodiments, an occurrence of the network-connection event may indicate that the client device is online. Additionally, the step of detecting that the client device is online may include detecting the network-connection event.

In another embodiment, the step of monitoring the network-connection state of the client device may include polling a network resource, while the step of detecting that the client device is online may include receiving a response from the network resource indicating that the client device in online. In this example, receiving a response from the network resource may indicate that the client device is online. In at least one embodiment, the step of polling the network resource may occur at predefined intervals.

In certain embodiments, the step of authenticating the user using offline authentication may include 1) requesting, from the user, offline credential information of the user and 2) validating the offline credential information of the user.

In some embodiments, the offline credential information may include a personal identifier assigned to the user and/or an authentication-device identifier that identifies an authentication device that has been used to successfully authenticate the user using online authentication.

In one embodiment, the method may further include, prior to authenticating the user using offline authentication, authenticating the user using online authentication. In this embodiment, the step of authenticating the user using online authentication may include 1) requesting, from the user, an online-authentication credential generated by the authentication device and 2) validating the online-authentication credential using the remote authentication service. Upon successful authentication of the user using online authentication, the method may also store the authentication-device identifier of the authentication device on the client device in order to subsequently authenticate the user using offline authentication.

In one embodiment, a system for implementing the above-described method may include 1) an access-attempt-identification module programmed to identify an attempt, by a user, to access a client device, 2) an offline-determination module programmed to, in response to identifying the attempt to access the client device, determine whether the client device is offline, 3) an offline-authentication module programmed to, in response to determining that the client device is offline, authenticate the user using offline authentication that does not require an active network connection with a remote authentication service, 4) an offline-access module programmed to, upon successful authentication of the user using offline authentication, allow the user to access the client device, 5) a connection-monitoring module programmed to, while the user is allowed to access the client device, monitor a network-connection state of the client device, 6) an online-detection module programmed to, while monitoring the network-connection state of the client device, detect that the client device is online, and 7) an access-locking module programmed to, in response to detecting that the client device is online, lock the client device in order to require the user to reauthenticate using online authentication that requires the active network connection with the remote authentication service. In one embodiment, the user may be required to be authenticated prior to being allowed to access the client device.

The system may also include a processor configured to execute the access-attempt-identification module, the offline-determination module, the offline-authentication module, the offline-access module, the connection-monitoring module, the online-detection module, and the access-locking module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify an attempt, by a user, to access a client device, 2) in response to identifying the attempt to access the client device, determine whether the client device is offline, 3) in response to determining that the client device is offline, authenticate the user using offline authentication that does not require an active network connection with a remote authentication service, 4) upon successful authentication of the user using offline authentication, allow the user to access the client device, 5) while the user is allowed to access the client device, monitor a network-connection state of the client device, 6) while monitoring the network-connection state of the client device, detect that the client device is online, and then 7) in response to detecting that the client device is online, lock the client device in order to require the user to reauthenticate using online authentication that requires the active network connection with the remote authentication service. In this example, the user may be required to be authenticated prior to being allowed to access the client device.

As will be explained in greater detail below, the systems and methods disclosed herein may efficiently and effectively secure corporate systems, information, and network resources using two-factor authentication by providing a method of offline two-factor authentication when a client device is offline and/or unable to communicate with a central authentication-service provider and by providing a method of online two-factor authentication when the client device is online and/or able to communicate with a central authentication-service provider. In this way, the systems and methods disclosed herein may allow a user to access a client device even though the client device is offline, while at the same time best securing corporate resources that are accessible to the user once the client device is online.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
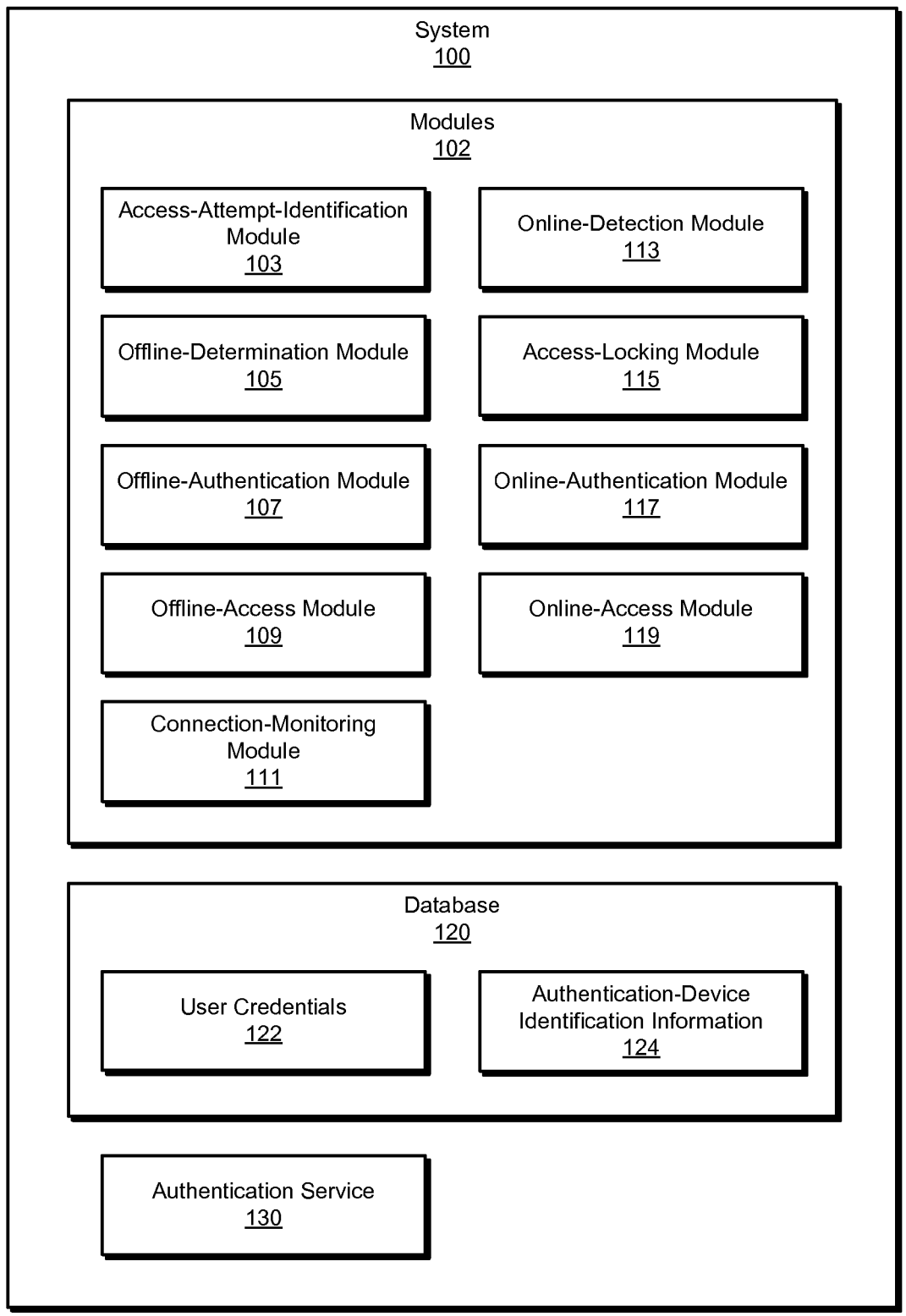
FIG. 1 is a block diagram of an exemplary system for managing offline authentication.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
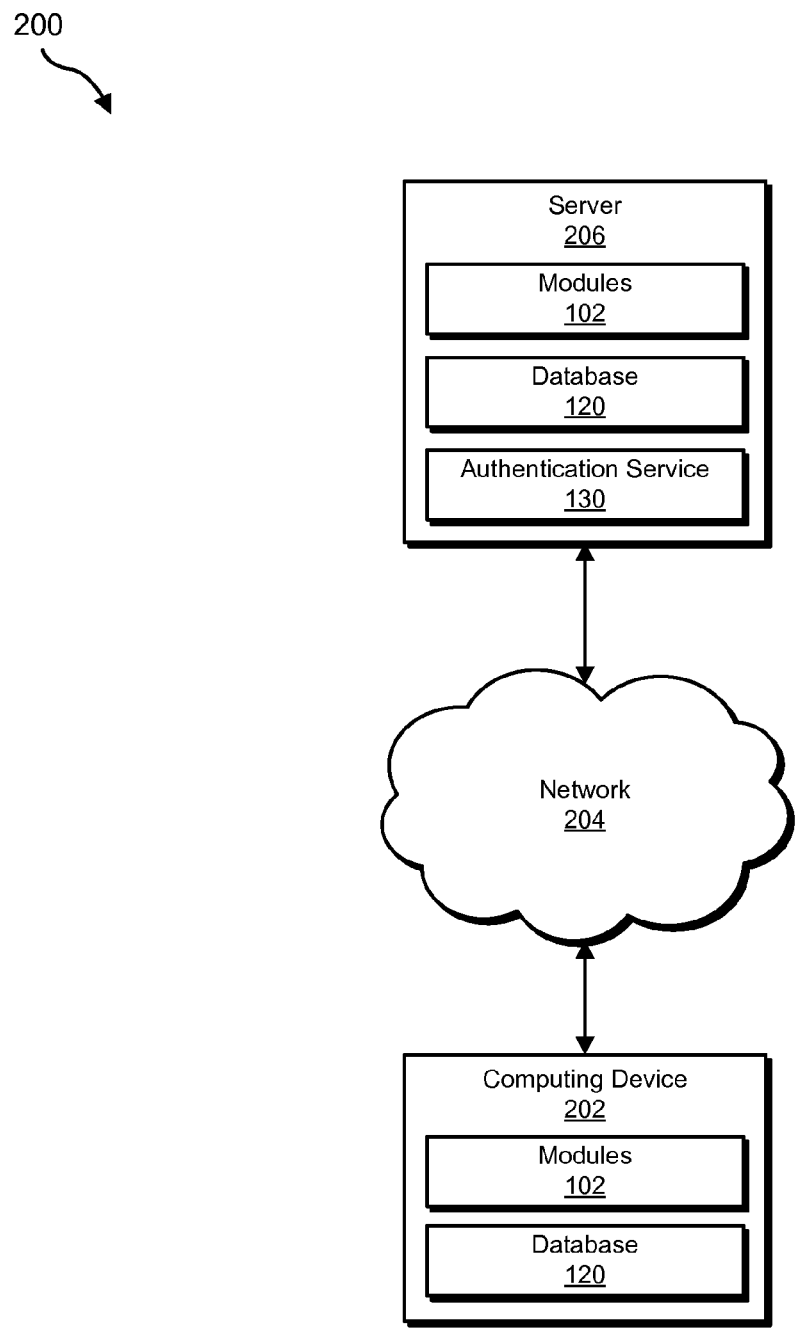
FIG. 2 is a block diagram of an exemplary system for managing offline authentication.

The following will provide, with reference to FIGS. 1-2, detailed descriptions of exemplary systems for managing offline authentication. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for managing offline authentication. As illustrated in this figure, exemplary system 100 may include one or more modules 102 for performing one or more tasks. For example, and as will be explained in greater detail below, exemplary system 100 may include an access-attempt-identification module 103 programmed to identify an attempt, by a user, to access a client device. Exemplary system 100 may also include an offline-determination module 105 programmed to determine whether the client device is offline.

Additionally, exemplary system 100 may include an offline-authentication module 107 programmed to authenticate the user using offline authentication. Exemplary system 100 may also include an offline-access module 109 programmed to allow the user to access the client device after the user has been successfully authenticated.

In addition, and as will be described in greater detail below, exemplary system 100 may include a connection-monitoring module 111 programmed to monitor the network-connection state of the client device while the user is allowed to access the client device. Exemplary system 100 may also include an online-detection module 113 programmed to detect that the client device is online. Exemplary system 100 may further include an access-locking module 115 programmed to lock the client device in response to detecting that the client device is online in order to require the user to reauthenticate using online authentication.

In addition, exemplary system 100 may include an online-authentication module 117 programmed to authenticate the user using online authentication in response to detecting that the client device is online. Exemplary system 100 may further include an online-access module 119 programmed to unlock the client device after the successful authentication of the user using online authentication. Although illustrated as separate elements, one or more of modules 102 in FIG. 1 may represent portions of a single module or application. For example, one or more of modules 102 in FIG. 1 may represent portions of a login, single sign-on, and/or access-control function of an operating system running on a client device.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. For example, and as will be explained in greater detail below, exemplary system 100 may include user credentials 122 for storing user-credential information. Exemplary system 100 may also include authentication-device-identification information 124 for storing information used to identify authentication devices that have been used to authenticate users using online authentication.

Database 120 may represent portions of a single database or computing device or a plurality of databases or computing devices. For example, database 120 may represent a portion of computing device 202 and/or server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as computing device 202 and/or server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204.

Computing device 202 generally represents any type or form of computing device capable of reading computer-executable instructions. Examples of computing device 202 include, without limitation, laptops, desktops, tablets, servers, smart phones, cellular phones, personal digital assistants (PDAs), multimedia players, embedded systems, combinations of one or more of the same, exemplary computing system 610 in FIG. 6, or any other suitable computing device. As illustrated in FIG. 2, computing device 202 may include modules 102 and database 120. In one example, modules 102 may perform one or more of the authentication functions (e.g., offline and/or online authentication of a user) used to manage a user's access to computing device 202, network 204, and/or server 206.

Server 206 generally represents any type or form of computing device that is capable of reading computer-executable instructions and performing one or more of the server-side operations described herein. Examples of server 206 include, without limitation, application servers and database servers configured to provide various database services and/or run certain software applications. As illustrated in FIG. 2, server 206 may include modules 102, database 120, and authentication service 130. Modules 102 and/or authentication service 130 may provide one or more authentication functions for computing device 202.

Network 204 generally represents any medium or architecture capable of facilitating communication or data transfer. Examples of network 204 include, without limitation, an intranet, a virtual private network (VPN), a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
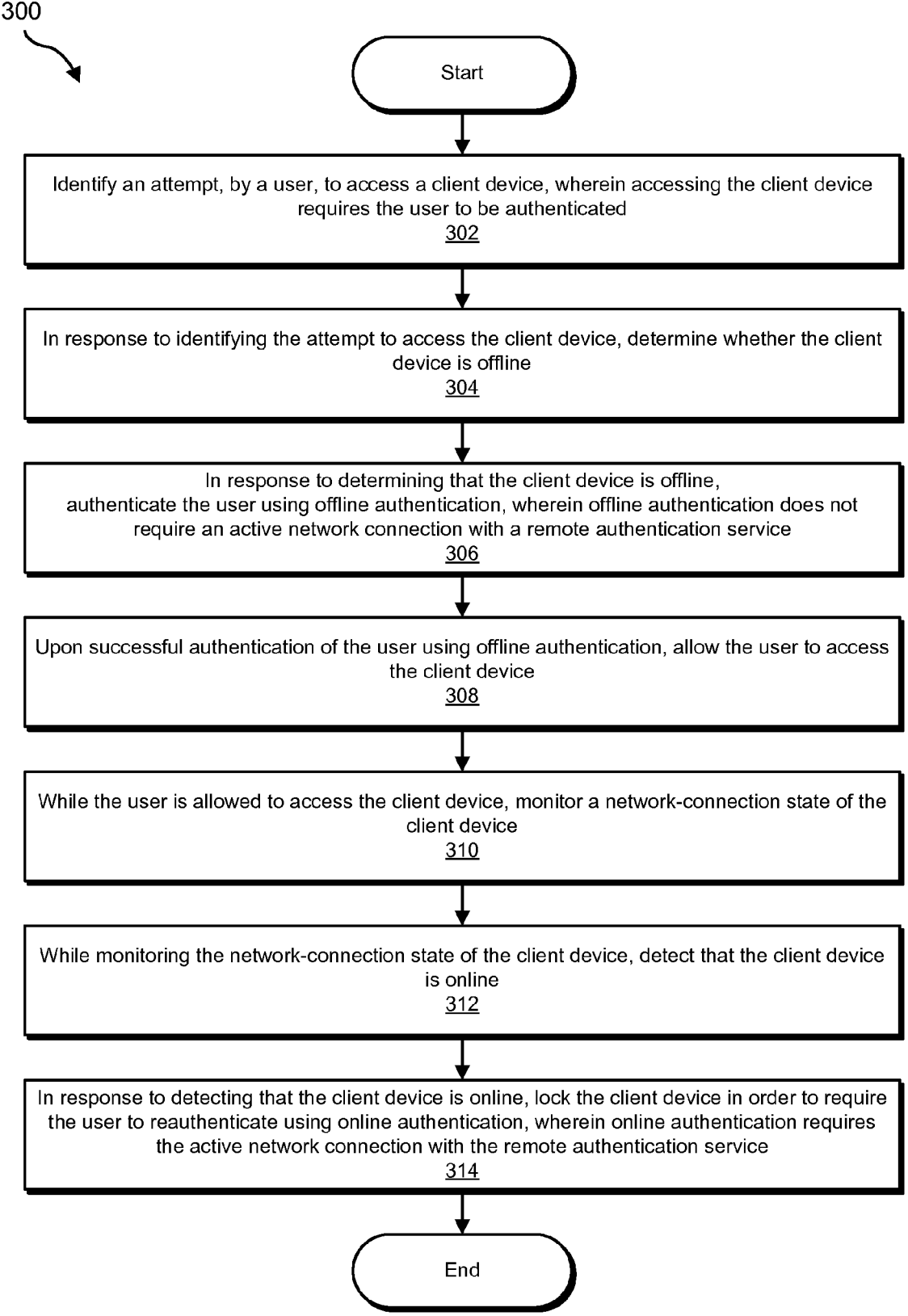
FIG. 3 is a flow diagram of an exemplary method for managing offline authentication.

FIG. 3 is a flow diagram of an exemplary computer-implemented method 300 for managing offline authentication. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

At step 302, one or more of the systems described herein may identify an attempt, by a user, to access a client device. For example, access-attempt-identification module 103 may identify an attempt, by a user, to access computing device 202 in FIG. 2 or client 710 in FIG. 7. In these examples, the user may be required to be authenticated prior to being allowed access to computing device 202 or client 710.

Access-attempt-identification module 103 may identify the attempt, by the user, to access a client device in a variety of ways. For example, access-attempt-identification module 103 may identify the attempt to access the client device by detecting an attempt to access an operating system or application running on the client device, by detecting an attempt to access information stored on the client device, by detecting an attempt to access or interact with an application, a service, or other resource accessible through the client device, and/or by detecting any other attempt to access any other resource that requires the user to be authenticated.

In one embodiment, access-attempt-identification module 103 may be part of an access-control function (e.g., a login or sign-on function) of an operating system running on the client device. For example, access-attempt-identification module 103 may be part of an access-control function of MICROSOFT WINDOWS, MAC OS, UNIX, LINUX, or another known operating system. In one example, as part of the access-control function, access-attempt-identification module 103 may detect when a user attempts to log into the operating system.

In some examples, the client device may be configured to use a single sign-on process that allows a user, who has successfully logged into the client device, to access various resources accessible on or through the client device without the need for further authentication. For example, after logging into computing device 202, a user may have access to one or more applications (e.g., an email application or a database application) and/or a portion of a local file system on computing device 202 without having to authenticate again. The user may also have access to a portion of network 204, server 206, and/or one or more software applications or database services on server 206 without the need for further authentication. In another example, after logging into client 710, a user may access portions of exemplary network architecture 700 in FIG. 7 without having to authenticate again.

In at least one embodiment, as will be explained in greater detail below, a user that has logged into a client device after having been authenticated using offline authentication may be allowed less access to resources available on or accessible through the client device than a user that has been authenticated using online authentication. For example, the user may not be allowed to access network-based resources until after the user is authenticated using online authentication.

At step 304, one or more of the systems described herein may, in response to identifying the attempt to access the client device, determine whether the client device is offline. For example, offline-determination module 105 may, in response to identifying the attempt to access computing device 202, determine whether computing device 202 is offline. In another example, offline-determination module 105 may, in response to identifying the attempt to access client 710, determine whether client 710 is offline.

As used herein, the term "offline" may generally refer to the state of being disconnected from and/or being unable to make a connection to an authentication service, a network, and/or any other network-based resource. For example, computing device 202 may be considered offline if computing device 202 cannot communicate with authentication service 130 on server 206, if computing device 202 is disconnected from network 204, if computing device 202 is unable to communicate with server 206 over network 204, and/or if an application running on computing device 202 is unable to communicate with an application running on server 206. In another example, client 710 may be considered offline if client 710 is disconnected from any or all of exemplary network architecture 700 in FIG. 7.

Offline-determination module 105 may determine whether the client device is offline in a variety of ways. In one embodiment, offline-determination module 105 may determine that the client device is offline by determining that the network-connection state of the client device is inactive. For example, offline-determination module 105 may determine that a communication interface (communication interface 622 in FIG. 6) of the client device is inactive, disconnected, and/or otherwise disabled. For example, offline-determination module 105 may detect that a wired network interface or a wireless network interface of the client device is not connected to a network.

In some embodiments, offline-determination module 105 may determine that the client device is offline by determining that the client device is not connected to an authentication service, a domain network, a corporate network, and/or the Internet. For example, offline-determination module 105 may determine that computing device 202 is offline by determining that computing device 202 is not connected to authentication service 130 on server 206. In one example, offline-determination module 105 may determine that computing device 202 is offline by determining that an attempt to use authentication service 130 for validation purposes has failed. In another example, offline-determination module 105 may determine that computing device 202 is offline by determining that authentication service 130 is down, offline, and/or otherwise unavailable.

In at least one embodiment, offline-determination module 105 may determine that the client device is offline by polling one or more network resource and may determine that the client device is offline if offline-determination module 105 does not receive a response from at least one of the one or more network resources. For example, offline-determination module 105 running on computing device 202 may poll server 206 and/or authentication service 130, and may determine that computing device 202 is offline if a response is not received from server 206 or authentication service 130. In another example, offline-determination module 105 running on client 710 in FIG. 7 may poll client 720, client 730, server 740, and/or server 745. In this example, offline-determination module 105 may determine that client 710 is offline if offline-determination module 105 does not receive a response from at least one of client 720, client 730, server 740, and/or server 745.

At step 306, one or more of the systems described herein may, in response to determining that the client device is offline, authenticate the user using offline authentication that does not require an active network connection with a remote authentication service. For example, offline-authentication module 107 may, in response to determining that computing device 202 is offline, authenticate the user using an offline authentication process that does not require an active network connection with authentication service 130 on server 206.

As used herein, the terms "offline authentication" and "online authentication" generally refer to any method of validating and/or confirming the identity of a user. The systems and methods described herein may authenticate users using offline authentication and/or online authentication based on knowledge-based credentials (e.g., something the user knows), token-based credentials (e.g., something the user has), biometric-based credentials (e.g., something the user is), and/or any combination thereof. For example, a knowledge-based credential may include a password, a personal identification number (PIN), and/or a passphrase, a token-based credential may include a one-time password and/or security code generated or received by a mobile and/or desktop computing device (e.g., a smart phone), and a biometric-based credential may include a fingerprint, a voiceprint, and/or an iris scan.

In some examples, offline authentication and/or online authentication may use a remote authentication service (e.g., authentication service 130) to validate authentication credentials of a user. In general, offline authentication may not require an active network connection with the remote authentication service at the moment a user is authenticated using offline authentication, while online authentication may require an active network connection with the remote authentication service at the moment a user is authenticated using online authentication. As used herein, the term "active network connection" may generally refer to a present ability to communicate over a network connection.

Because online authentication uses an active network connection with the remote authentication service to validate authentication credentials, online authentication may provide a greater level of security as compared to offline authentication. For this reason, the systems and methods disclosed herein may manage offline and online authentication in order to best protect system, information, and network resources by selecting the best method of authentication depending on whether a client device that a user attempts to access is offline or online. For example, the systems and methods disclosed herein may use online authentication as a preferred method of authenticating users and may only authenticate users using offline authentication when a client device is offline. Additionally, a user that has been authenticated using offline authentication may be allowed less access to a client device than a user that has been authenticated using online authentication. For example, until a user is authenticated using online authentication, the user may have access to only local and/or non-network-based resources accessible through the client device.

Offline-authentication module 107 may authenticate the user using offline authentication in a variety of ways. In one embodiment, offline-authentication module 107 may authenticate the user using offline authentication by 1) requesting, from the user, offline credential information of the user and 2) validating the offline credential information of the user. For example, offline-authentication module 107 may authenticate a user attempting to access computing device 202 by validating authentication credentials received from the user against information stored in user credentials 122 and/or authentication-device-identification information 124.

In some embodiments, offline credential information may include a personal identifier (e.g., a password or PIN) assigned to the user and/or an authentication-device identifier (e.g., a serial number). In this embodiment, an authentication-device identifier may identify an authentication device that has been used to successfully authenticate the user using online authentication. The following discussion corresponding to FIG. 4 provides explanations and examples of how the systems and methods disclosed herein may authenticate the user using offline authentication.

Figure 4:
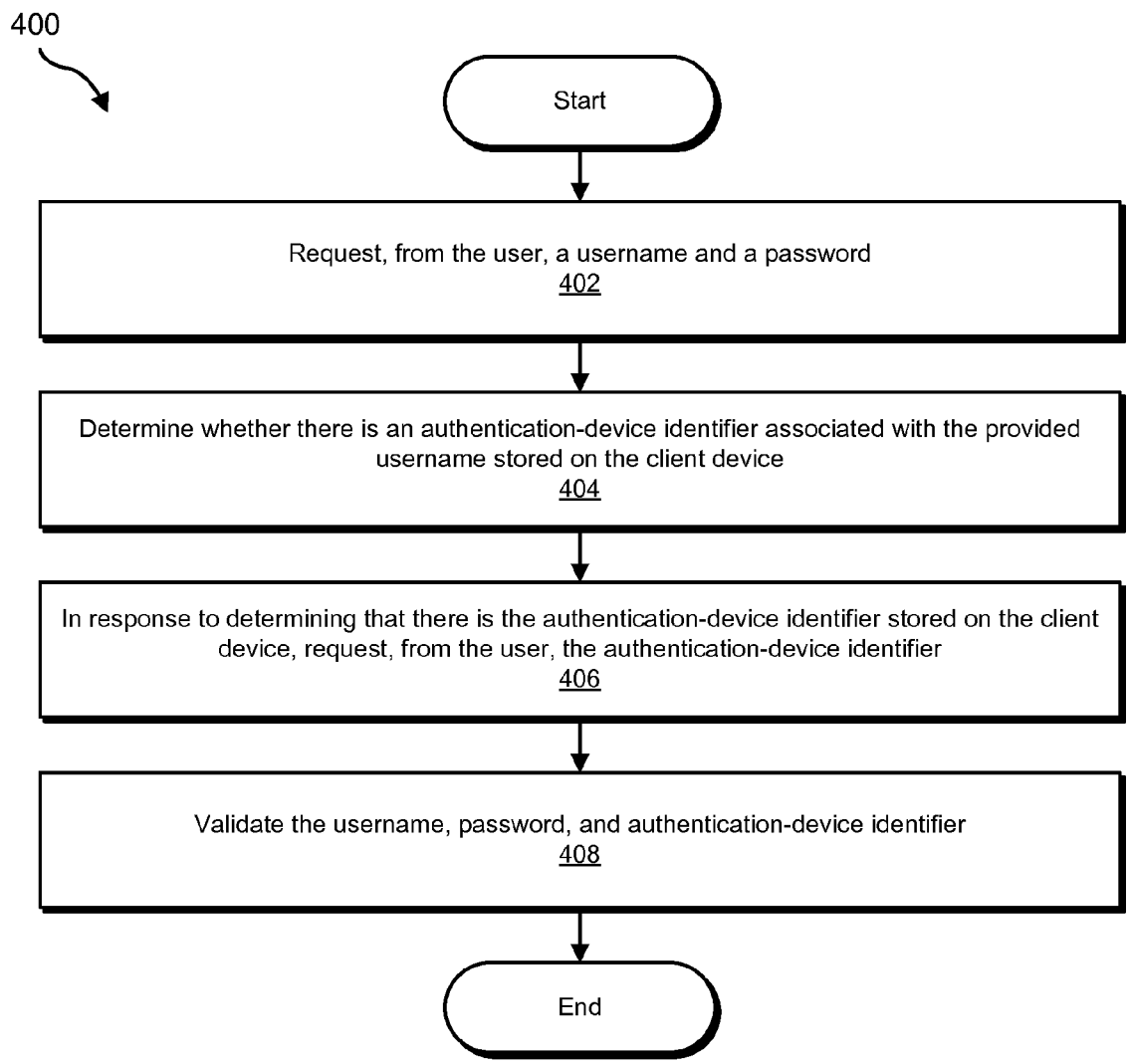
FIG. 4 is a flow diagram of an exemplary method for performing offline two-factor authentication.

FIG. 4 is a flow diagram of an exemplary computer-implemented method 400 for performing offline two-factor authentication. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 610 in FIG. 6, and/or portions of exemplary network architecture 700 in FIG. 7.

At step 402, one or more of the systems described herein may request, from the user, a username and a password. For example, offline-authentication module 107 may request a username and password from the user. In this example, the username and password may represent the knowledge-based authentication credential required as part of two-factor authentication.

In at least one embodiment, offline-authentication module 107 may be part of an access-control function of an operating system. For example, offline-authentication module 107 may be part of an access-control function of MICROSOFT WINDOWS, MAC OS, UNIX, LINUX, or another known operating system. As part of the access-control function, offline-authentication module 107 may request a username and password from the user as part of a login process.

At step 404, one or more of the systems described herein may determine whether there is an authentication-device identifier associated with the provided username stored on the client device. For example, offline-authentication module 107 may determine whether there is an authentication-device identifier associated with the provided username stored in authentication-device-identification information 124 on computing device 202.

In some embodiments, prior to being able to be authenticated using offline authentication, a user may be required to authenticate using online authentication. In one example, as will be explained in greater detail below as part of the discussion of FIG. 5, online-authentication module 117 may have authenticated the user using online authentication by 1) requesting, from the user, an online-authentication credential generated by an authentication device, 2) validating the online-authentication credential using authentication service 130, and then 3) upon successful authentication of the user using online authentication, storing the authentication-device identifier of the authentication device in authentication-device-identification information 124 on computing device 202. Online-authentication module 117 may also store information associating the user with the authentication-device identifier in authentication-device-identification information 124 on computing device 202 in order to subsequently authenticate the user using offline authentication.

In this embodiment, offline-authentication module 107 may determine whether the user was previously authorized using online authentication by determining whether there is an authentication-device identifier associated with the username and/or password, received from the user as part of step 402, stored in authentication-device-identification information 124.

At step 406, one or more of the systems described herein may, in response to determining that there is the authentication-device identifier stored on the client device, request, from the user, the authentication-device identifier. For example, offline-authentication module 107 may request, from the user, the authentication-device identifier. In this example, the authentication-device identifier may represent the token-based authentication credential required as part of two-factor authentication.

Offline-authentication module 107 may request the authentication-device identifier in a variety of ways. In one example, an authentication-device identifier may include a combination of characters and/or digits (e.g., VSTT25272378 or VSGY33872397). In this example, offline-authentication module 107 may request all or a portion of the authentication-device identifier from the user.

In one example, offline-authentication module 107 may prompt the user to provide four characters and/or digits of the authentication-device identifier. For example, offline-authentication module 107 may prompt the user to provide the third, sixth, seventh and tenth character and/or digit of the authentication-device identifier. In another example, offline-authentication module 107 may prompt the user to provide the last four characters and/or digits of the authentication-device identifier.

At step 408, one or more of the systems described herein may validate the username, password, and/or the authentication-device identifier. For example, offline-authentication module 107 may validate the username, password, and/or the authentication-device identifier against authentication information stored in user credentials 122 and/or authenticationdevice-identification information 124. In one example, offline-authentication module 107 may validate the username and password using an operating system authentication function.

Returning to FIG. 3, at step 308, one or more of the systems described herein may, upon successful authentication of the user using offline authentication, allow the user to access the client device. For example, offline-access module 109 may allow the attempt to access the client device that was identified as part of step 302.

Offline-access module 109 may allow the user to access computing device 202 in a variety of ways. In one example, offline-access module 109 may allow the user to access an operating system running on the client device by allowing the user to log into the operating system. In other examples, offline-access module 109 may allow the user to access an application running on the client device, information stored on the client device, and/or an application, a service, or other resource accessible through the client device while the client device is offline.

In one example, offline-access module 109 may provide less access to the client device to the user compared to a user that has been authenticated using online authentication. For example, offline-access module 109 may prohibit a user from accessing applications, file systems, services, and/or other resources that require the user to be authenticated using online authentication. In another example, offline-access module 109 may restrict or limit access to applications, file systems, services, and/or other resources that require the user to be authenticated using online authentication.

At step 310, one or more of the systems described herein may, while the user is allowed to access the client device, monitor a network-connection state of the client device. For example, connection-monitoring module 111 may, while the user is allowed to access computing device 202, monitor the network-connection state of computing device 202. As used herein, the term "network-connection state" may refer to the network-connection status of a client device. For example, a network-connection state may be active or inactive, connected or disconnected, enabled or disabled, and/or any other state that may indicate whether a client device is either online or offline.

Connection-monitoring module 111 may monitor the network-connection state of computing device 202 in a variety of ways. In some embodiments, connection-monitoring module 111 may monitor the network-connection state of computing device 202 by monitoring the network-connection state of computing device 202 for a network-connection event. In this embodiment, an occurrence of the network-connection event may indicate that computing device 202 is online. In one example, connection-monitoring module 111 may register a network-connection event trigger with an operating system or service running on the client device that will notify connection-monitoring module 111 of any change in the network-connection state of the client device. For example, connection-monitoring module 111 may implement and register an ADDCONNECTNOTIFY function with a MICROSOFT WINDOWS operating system or a similar network-connection event trigger with MAC OS, UNIX, LINUX, or another known operating system. In one example, a network-connection event trigger may notify connection-monitoring module 111 that the network-connection state of the client device has changed from inactive to active.

In another embodiment, connection-monitoring module 111 may monitor the network-connection state of the client device by polling a network resource. In this embodiment, receiving a response from the network resource may indicate that the client device is online. For example, connection-monitoring module 111 may ping an authentication service and/or a communication endpoint located on a domain network, a corporate network, and/or the Internet. In one example, connection-monitoring module 111 may monitor the network-connection state of computing device 202 by polling authentication service 130 on server 206. In another example, connection-monitoring module 111 running on client 710 in FIG. 7 may poll client 720, client 730, server 740, and/or server 745.

In some embodiments, connection-monitoring module 111 may poll the network resource at predefined intervals. For example, connection-monitoring module 111 may poll the network resource once every second, once every minute, once every hour, once every day, at a time interval specified by an administrator, or at any other time.

In another example, connection-monitoring module 111 may monitor a communication interface (communication interface 622 in FIG. 6) of computing device 202. For example, connection-monitoring module 111 may monitor a wired network interface or a wireless network interface of computing device 202.

At step 312, one or more of the systems described herein may, while monitoring the network-connection state of the client device, detect that the client device is online. For example, online-detection module 113 may, while monitoring the network-connection state of computing device 202, detect that computing device 202 is online.

As used herein, the term "online" may generally refer to the state of being connected and/or able to make a connection to an authentication service, a network, and/or another network resource. For example, computing device 202 may be considered online if computing device 202 is connected to authentication service 130 on server 206, if computing device 202 is connected to network 204, if computing device 202 is able to communicate with server 206 over network 204, and/or if an application running on computing device 202 is able to communicate with an application or service running on server 206.

Online-detection module 113 may detect that computing device 202 is online in a variety of ways. In one embodiment, online-detection module 113 may detect that computing device 202 is online by determining that the network-connection state of the client device is active. For example, online-detection module 113 may determine that a communication interface (communication interface 622 in FIG. 6) of computing device 202 is active, connected, and/or otherwise enabled. For example, online-detection module 113 may detect that a wired network interface or a wireless network interface of computing device 202 is connected to network 204.

In some embodiments, online-detection module 113 may determine that the client device is online by determining that the client device is connected to an authentication service (e.g., authentication service 130 on server 206), a domain network, a corporate network, and/or the Internet. For example, as mentioned above, connection-monitoring module 111 may poll a network resource as a way of monitoring the network-connection state of the client device. In this example, online-detection module 113 may detect that the client device is online by receiving a response from the network resource indicating that the client device in online. For example, online-detection module 113 running on client 710 in FIG. 7 may detect that client 710 is online by receiving a response from at least one of client 720, client 730, server 740, and/or server 745.

As mentioned above, connection-monitoring module 111 may monitor the network-connection state of the client device for a network-connection event. In some embodiments, online-detection module 113 may detect that the client device is online by detecting the network-connection event. For example, online-detection module 113 may receive a notification from an operating system or service running on the client device indicating that the network-connection state is active and/or that the client device is online.

At step 314, one or more of the systems described herein may, in response to detecting that the client device is online, lock the client device in order to require the user to reauthenticate using online authentication, wherein online authentication requires the active network connection with the remote authentication service. For example, access-locking module 115 may immediately lock computing device 202 in response to detecting that computing device 202 is online in order to require the user to reauthenticate using online authentication that requires an active network connection with authentication service 130 on server 206.

Access-locking module 115 may lock computing device 202 in a variety of ways. For example, access-locking module 115 may lock the client device by disallowing access to the client device. In some examples, access-locking module 115 may lock the client device by preventing the user from accessing or controlling an operating system or application running on the client device, by preventing the user from accessing information stored on the client device, by preventing the user from accessing or interacting with an application, a service, or other resource accessible through the client device, and/or by preventing the user from accessing any other resource that requires the user to be authenticated using online authentication.

In another example, access-locking module 115 may lock the client device by logging or signing off the user from an operation system running on the client device. In yet another example, access-locking module 115 may lock the client device by displaying a lock screen to the user. For example, access-locking module 115 may call a LOCKWORKSTATION function of a MICROSOFT WINDOWS operating system or a similar function of MAC OS, UNIX, LINUX, or another known operating system.

In certain embodiments, after access-locking module 115 locks the client device, one or more of the systems and methods describe herein, may allow the user to reauthenticate using online authentication, after which the user may again be allowed to access the client device. For example, online-authentication module 117 may, in response to detecting that computing device 202 is online, authenticate the user using online authentication, after which online-access module 119 may unlock computing device 202 and allow the user to again access computing device 202. The discussion corresponding to FIG. 5 provides explanations and examples of how the user may be authenticated using online authentication.

Figure 5:
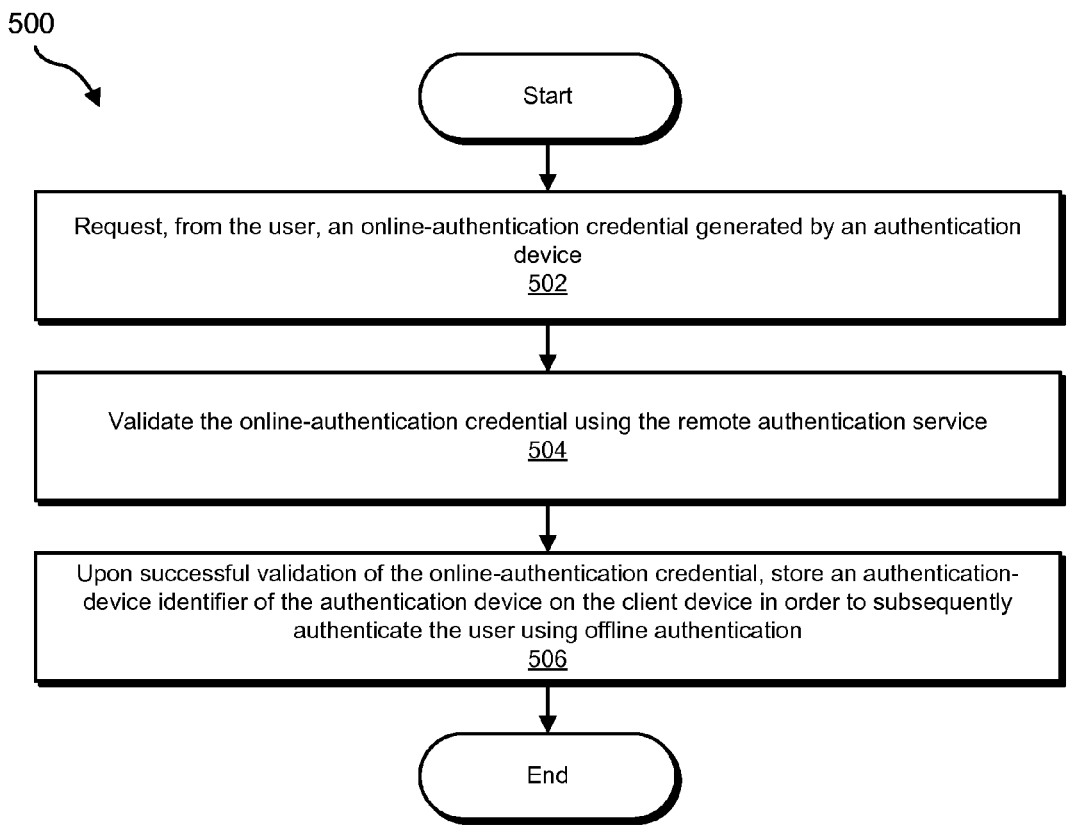
FIG. 5 is a flow diagram of an exemplary method for performing online authentication.

FIG. 5 is a flow diagram of an exemplary computer-implemented method 500 for performing online authentication. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, computing system 610 in FIG. 6, and/or portions of exemplary network architecture 700 in FIG. 7.

At step 502, one or more of the systems described herein may request, from a user, an online-authentication credential generated by an authentication device. For example, online-authentication module 117 may request a one-time password and/or a security code generated or received by a mobile and/or desktop computing device (e.g., a smart phone) assigned to the user.

At step 504, one or more of the systems described herein may validate the online-authentication credential using the remote authentication service. For example, online-authentication module 117 may send the one-time password received from the user as part of step 502 to authentication service 130 on server 206 via network 204, and may receive from authentication service 130 a response indicating that the one-time password has been validated successfully.

At step 506, one or more of the systems described herein may, upon successful validation of the online-authentication credential, store an authentication-device identifier of the authentication device on the client device in order to subsequently authenticate the user using offline authentication. For example, online-authentication module 117 may receive, as part of the response received from authentication service 130 indicating that the one-time password has been validated successfully, an authentication-device identifier of the authentication device that generated the one-time password. In this example, online-authentication module 117 may cache the authentication-device identifier by storing the authentication-device identifier in authentication-device-identification information 124. In some examples, online-authentication module 117 may maintain more than one authentication-device identifier associated with the user in authentication-device-identification information 124.

Figure 6:
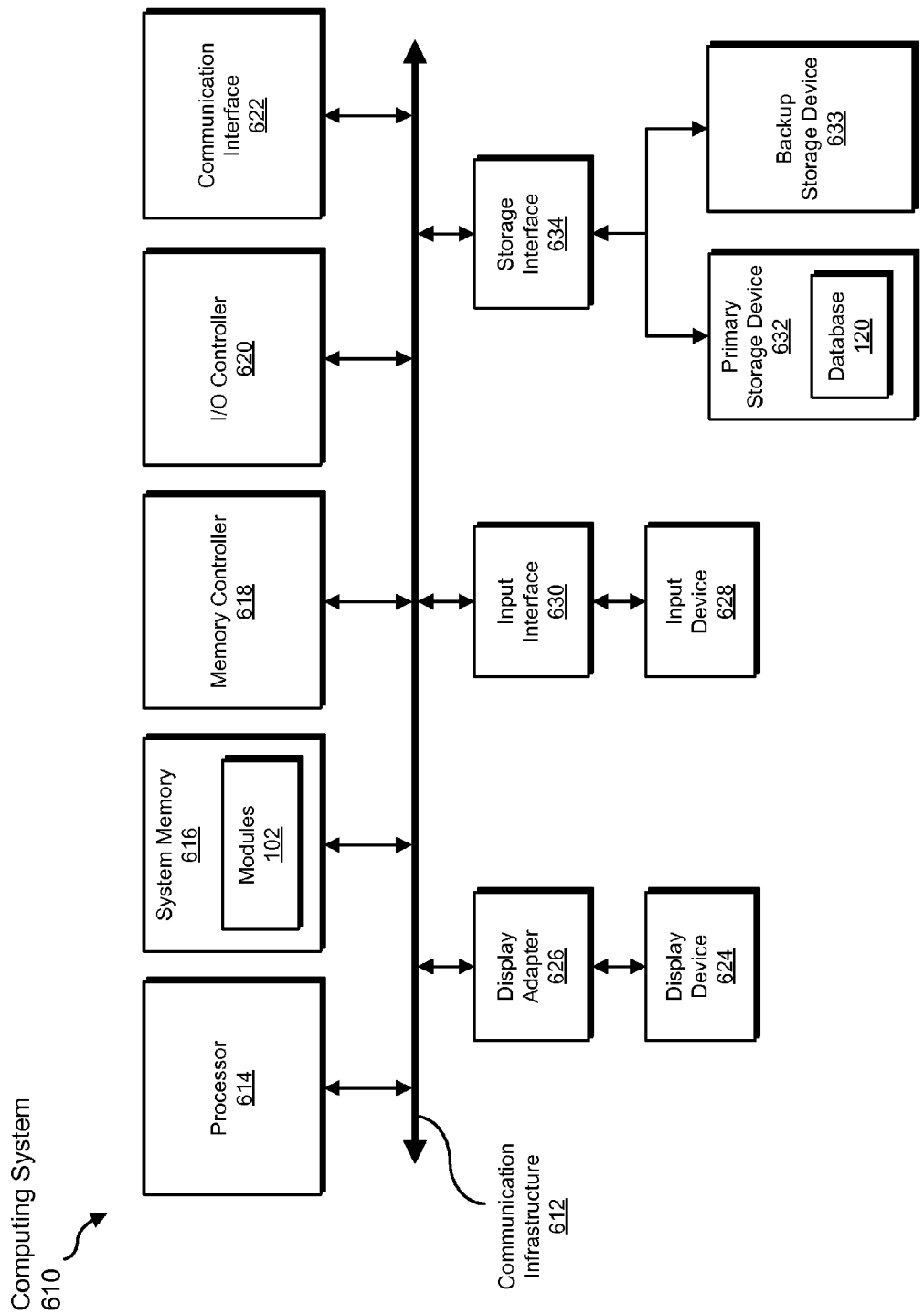
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the managing, identifying, determining, authenticating, allowing, monitoring, detecting, locking, unlocking, polling, receiving, requesting, validating, and storing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
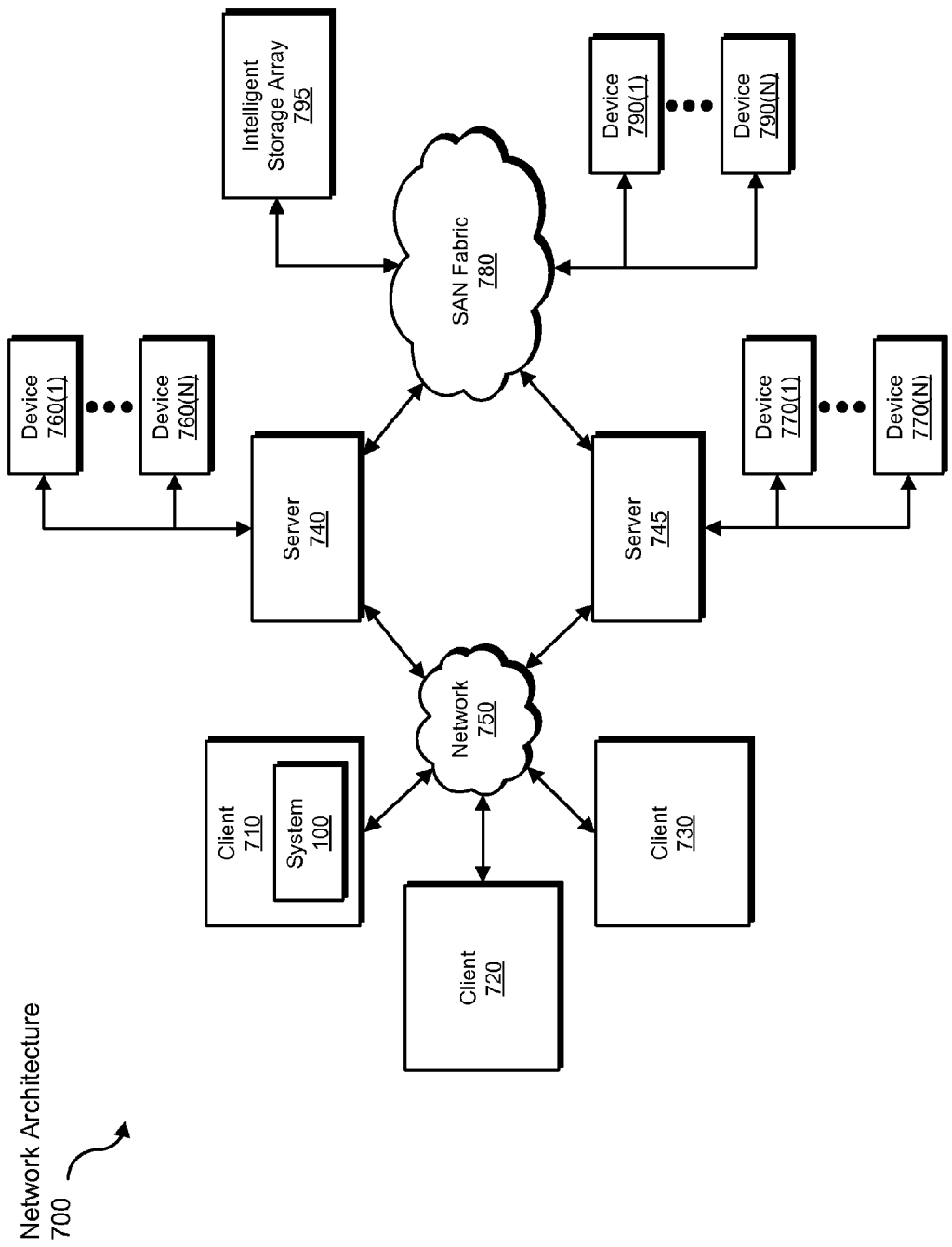
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the managing, identifying, determining, authenticating, allowing, monitoring, detecting, locking, unlocking, polling, receiving, requesting, validating, and storing steps disclosed herein. All or a portion of network architecture 700 may also be used to perform and/or be a means for performing other steps and features set forth in the instant disclosure. In at least one example, network architecture 700 may represent a portion of a corporate network, a virtual private network, and/or domain network.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for managing offline authentication.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device (such as computing device 202 and/or server 206 in FIG. 2) into a computing device that is capable of managing offline authentication.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing offline authentication, the method comprising:
    identifying an attempt, by a user, to access a client device, wherein accessing the client device requires the user to be authenticated;
    in response to identifying the attempt to access the client device, determining that the client device is offline;
    in response to determining that the client device is offline:
        authenticating the user using offline authentication, wherein offline authentication does not require an active network connection with a remote authentication service;
        upon successful authentication of the user using offline authentication, allowing the user to access the client device;
        while the user is allowed to access the client device, monitoring a network-connection state of the client device;
        while monitoring the network-connection state of the client device, detecting that the client device is online;
        in response to detecting that the client device is online, locking the client device in order to require the user to reauthenticate using online authentication, wherein online authentication requires the active network connection with the remote authentication service;
    wherein the identifying, determining, authenticating, allowing, monitoring, detecting, and locking steps are executed on a processor of the client device.

2. The computer-implemented method of claim 1, further comprising:
    in response to detecting that the client device is online, authenticating the user using online authentication;
    upon successful authentication of the user using online authentication, unlocking the client device.

3. The computer-implemented method of claim 1, wherein determining that the client device is offline comprises at least one of:
    determining that the network-connection state of the client device is inactive;
    determining that the client device is not connected to at least one of:
        the remote authentication service;
        a domain network;
        a corporate network;
        the Internet.

4. The computer-implemented method of claim 1, wherein detecting that the client device is online comprises at least one of:
    determining that the network-connection state of the client device is active;
    determining that the client device is connected to at least one of:
        the remote authentication service;
        a domain network;
        a corporate network;
        the Internet.

5. The computer-implemented method of claim 1, wherein:
    monitoring the network-connection state of the client device comprises monitoring the network-connection state of the client device for a network-connection event, wherein an occurrence of the network-connection event indicates that the client device is online;
    detecting that the client device is online comprises detecting the network-connection event.

6. The computer-implemented method of claim 1, wherein:
    monitoring the network-connection state of the client device comprises polling a network resource, wherein receiving a response from the network resource indicates that the client device is online;
    detecting that the client device is online comprises receiving the response from the network resource indicating that the client device is online.

7. The computer-implemented method of claim 6, wherein polling the network resource occurs at predefined intervals.

8. The computer-implemented method of claim 1, wherein authenticating the user using offline authentication comprises:
    requesting, from the user, offline credential information of the user;
    validating the offline credential information of the user.

9. The computer-implemented method of claim 8, wherein the offline credential information comprises at least one of:
    a personal identifier assigned to the user;
    an authentication-device identifier, the authentication-device identifier identifying an authentication device that has been used to successfully authenticate the user using online authentication.

10. The computer-implemented method of claim 9, further comprising:

prior to authenticating the user using offline authentication, authenticating the user using online authentication, wherein authenticating the user using online authentication comprises:
    requesting, from the user, an online-authentication credential generated by the authentication device;
    validating the online-authentication credential using the remote authentication service;
upon successful authentication of the user using online authentication, storing the authentication-device identifier of the authentication device on the client device in order to subsequently authenticate the user using offline authentication.

11. A system for managing offline authentication, the system comprising:
    an access-attempt-identification module programmed to identify an attempt, by a user, to access a client device, wherein accessing the client device requires the user to be authenticated;
    an offline-determination module programmed to, in response to identifying the attempt to access the client device, determine that the client device is offline;
    an offline-authentication module programmed to, in response to determining that the client device is offline, authenticate the user using offline authentication, wherein offline authentication does not require an active network connection with a remote authentication service;
    an offline-access module programmed to, upon successful authentication of the user using offline authentication, allow the user to access the client device;
    a connection-monitoring module programmed to, while the user is allowed to access the client device, monitor a network-connection state of the client device;
    an online-detection module programmed to, while monitoring the network-connection state of the client device, detect that the client device is online;
    an access-locking module programmed to, in response to detecting that the client device is online, lock the client device in order to require the user to reauthenticate using online authentication, wherein online authentication requires the active network connection with the remote authentication service;
    at least one processor configured to execute the access-attempt-identification module, the offline-determination module, the offline-authentication module, the offline-access module, the connection-monitoring module, the online-detection module, and the access-locking module.

12. The system of claim 11, further comprising:
    an online-authentication module programmed to, in response to detecting that the client device is online, authenticate the user using online authentication;
    an online-access module programmed to, upon successful authentication of the user using online authentication, unlock the client device.

13. The system of claim 11, wherein the offline-determination module is programmed to determine that the client device is offline by performing at least one of:
    determining that the network-connection state of the client device is inactive;
    determining that the client device is not connected to at least one of:
        the remote authentication service;
        a domain network;
        a corporate network;
        the Internet.

14. The system of claim 11, wherein the online-detection module is programmed to detect that the client device is online by performing at least one of:
    determining that the network-connection state of the client device is active;
    determining that the client device is connected to at least one of:
        the remote authentication service;
        a domain network;
        a corporate network;
        the Internet.

15. The system of claim 11, wherein:
    the connection-monitoring module is programmed to monitor the network-connection state of the client device by monitoring the network-connection state of the client device for a network-connection event, wherein an occurrence of the network-connection event indicates that the client device is online;
    the online-detection module is programmed to detect that the client device is online by detecting the network-connection event.

16. The system of claim 11, wherein:
    the connection-monitoring module is programmed to monitor the network-connection state of the client device by polling a network resource, wherein receiving a response from the network resource indicates that the client device is online;
    the online-detection module is programmed to detect that the client device is online by receiving the response from the network resource indicating that the client device is online.

17. The system of claim 11, wherein the offline-authentication module is programmed to authenticate the user using offline authentication by:
    requesting, from the user, offline credential information of the user;
    validating the offline credential information of the user.

18. The system of claim 17, wherein the offline credential information comprises at least one of:
    a personal identifier assigned to the user;
    an authentication-device identifier, the authentication-device identifier identifying an authentication device that has been used to successfully authenticate the user using online authentication.

19. The system of claim 18, wherein the online-authentication module is further programmed to:
    prior to authenticating the user using offline authentication, authenticate the user using online authentication, wherein authenticating the user using online authentication comprises:
        requesting, from the user, an online-authentication credential generated by the authentication device;
        validating the online-authentication credential using the remote authentication service;
    upon successful authentication of the user using online authentication, store the authentication-device identifier of the authentication device on the client device in order to subsequently authenticate the user using offline authentication.

20. A non-transitory computer-readable-storage medium comprising one or more computer-executable instructions that, when executed by at least one processor of a computing device, cause the computing device to:
    identify an attempt, by a user, to access a client device, wherein accessing the client device requires the user to be authenticated;

in response to identifying the attempt to access the client device, determine that the client device is offline;

in response to determining that the client device is offline:

authenticate the user using offline authentication, wherein offline authentication does not require an active network connection with a remote authentication service;

upon successful authentication of the user using offline authentication, allow the user to access the client device;

while the user is allowed to access the client device, monitor a network-connection state of the client device;

while monitoring the network-connection state of the client device, detect that the client device is online;

in response to detecting that the client device is online, lock the client device in order to require the user to reauthenticate using online authentication, wherein online authentication requires the active network connection with the remote authentication service.

\* \* \* \* \*